April 7, 1959  E. G. HUFNAGEL  2,880,559
MACHINE AND METHOD OF MAKING AN ICE CREAM AND SIMILAR UNIT
Filed Oct. 31, 1956  5 Sheets-Sheet 4
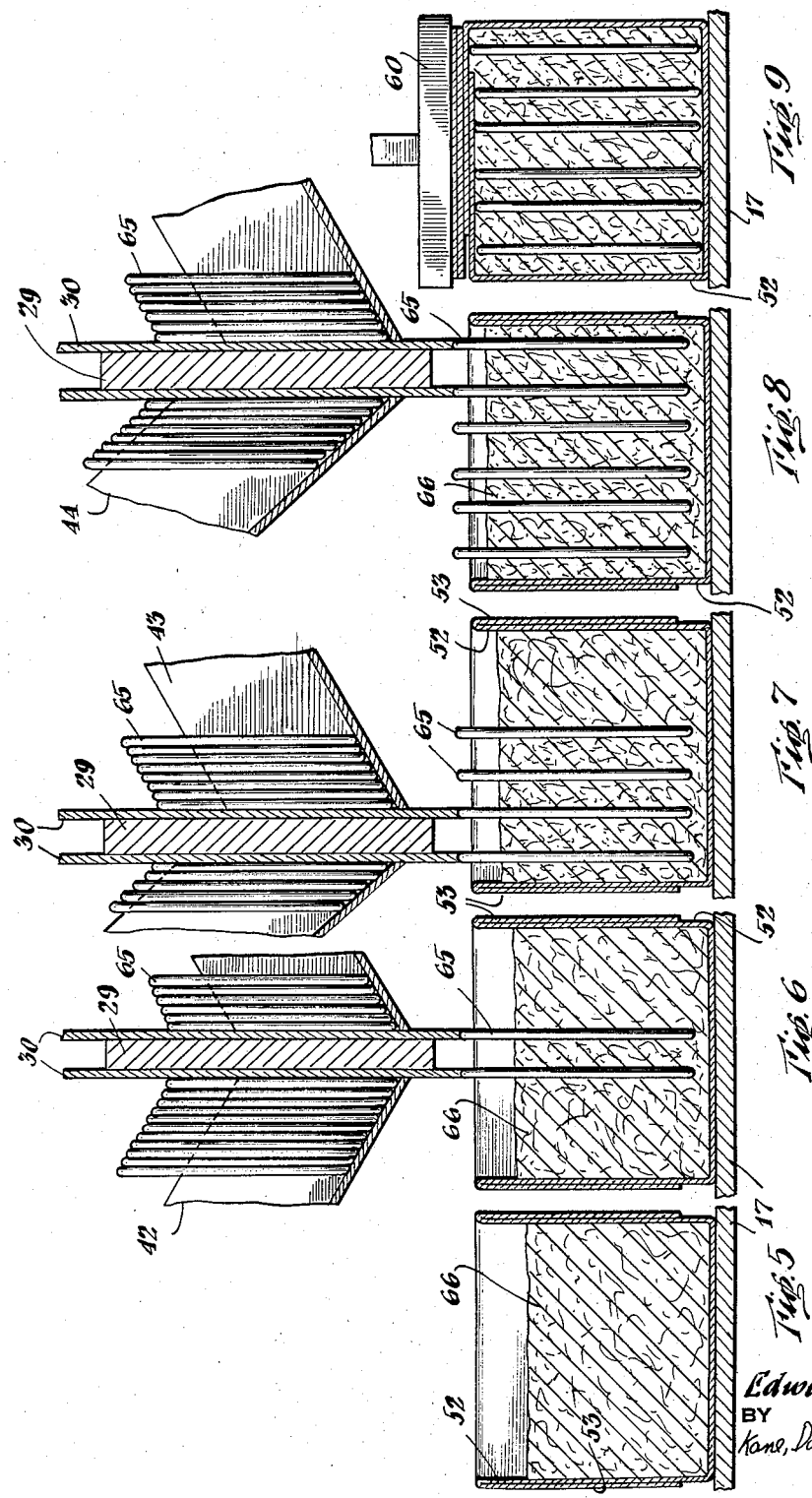
INVENTOR
Edwin G. Hufnagel
BY
Kane, Dalsimer and Kane
ATTORNEYS April 7, 1959 E. G. HUFNAGEL 2,880,559
MACHINE AND METHOD OF MAKING AN ICE CREAM AND SIMILAR UNIT
Filed Oct. 31, 1956 5 Sheets-Sheet 5
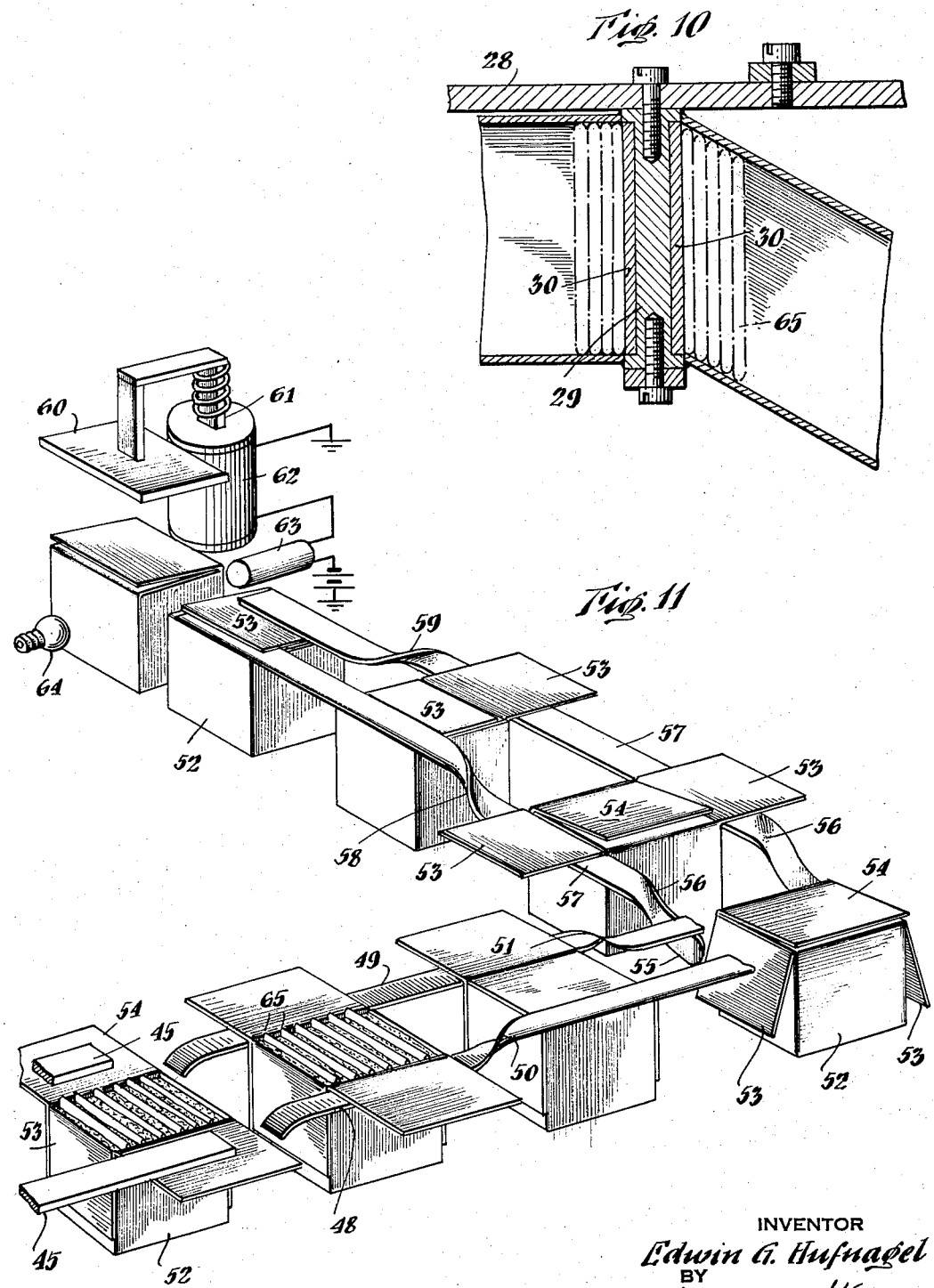
INVENTOR
Edwin G. Hufnagel
BY
Kane, Dalsimer and Kane
ATTORNEYS

United States Patent Office

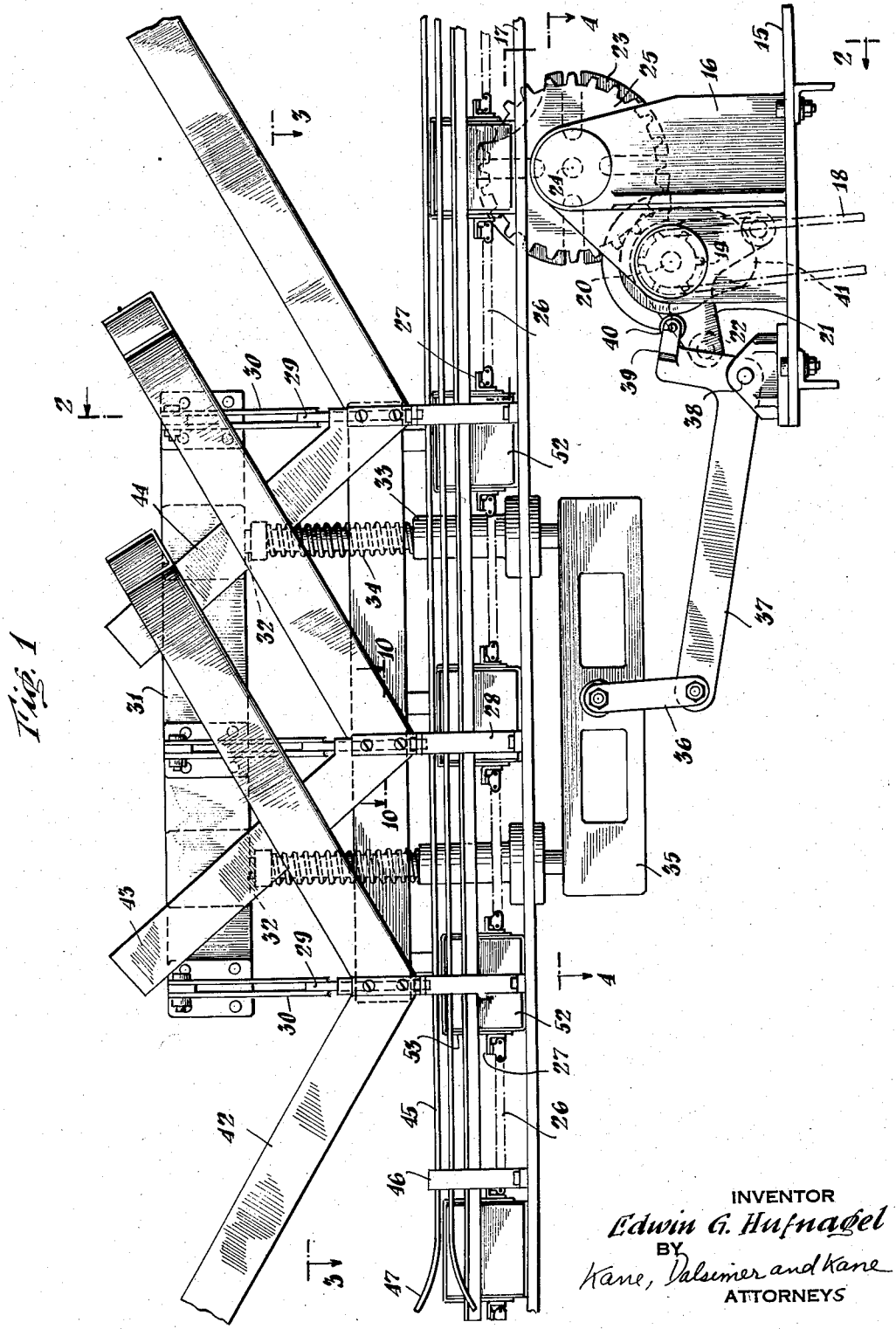

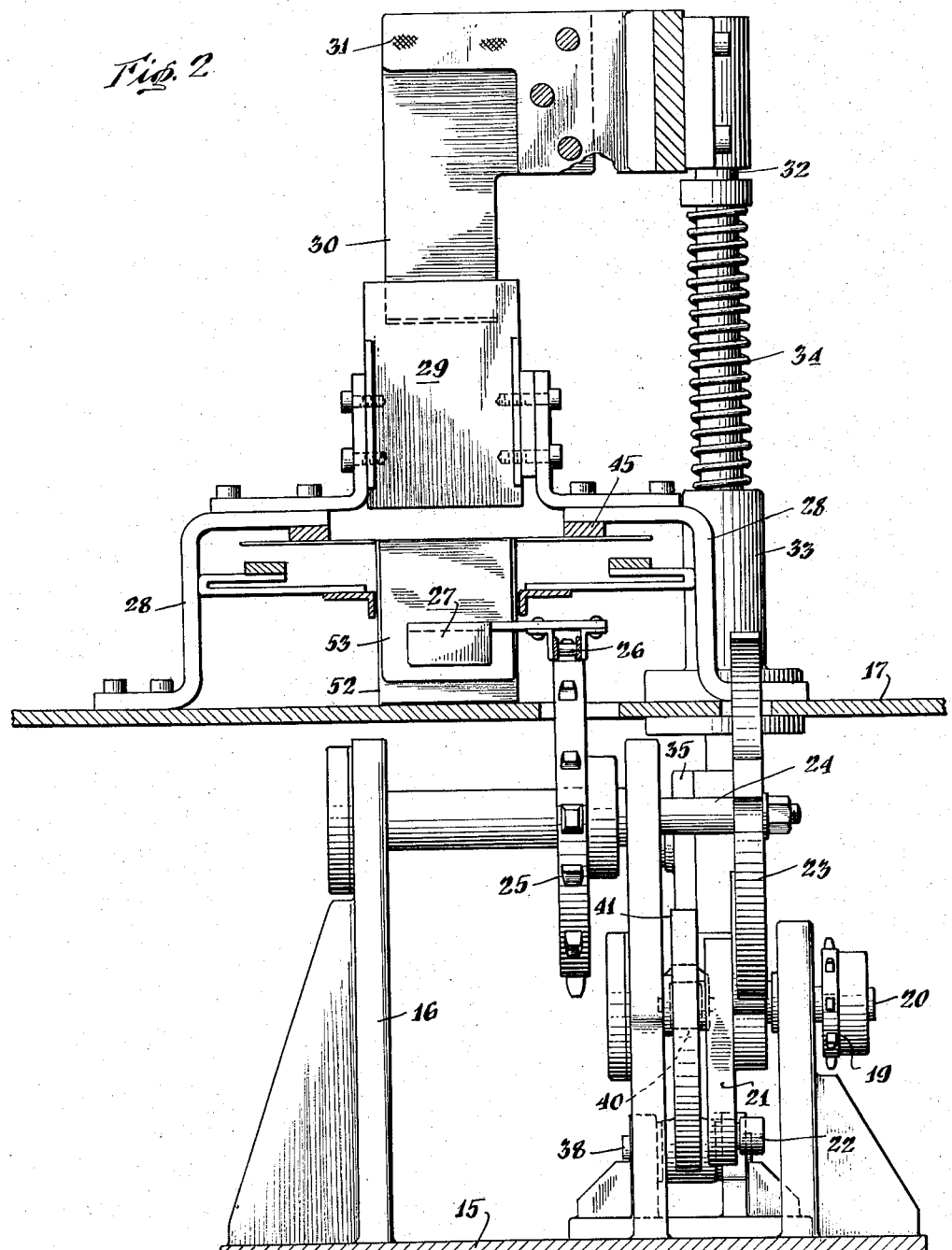

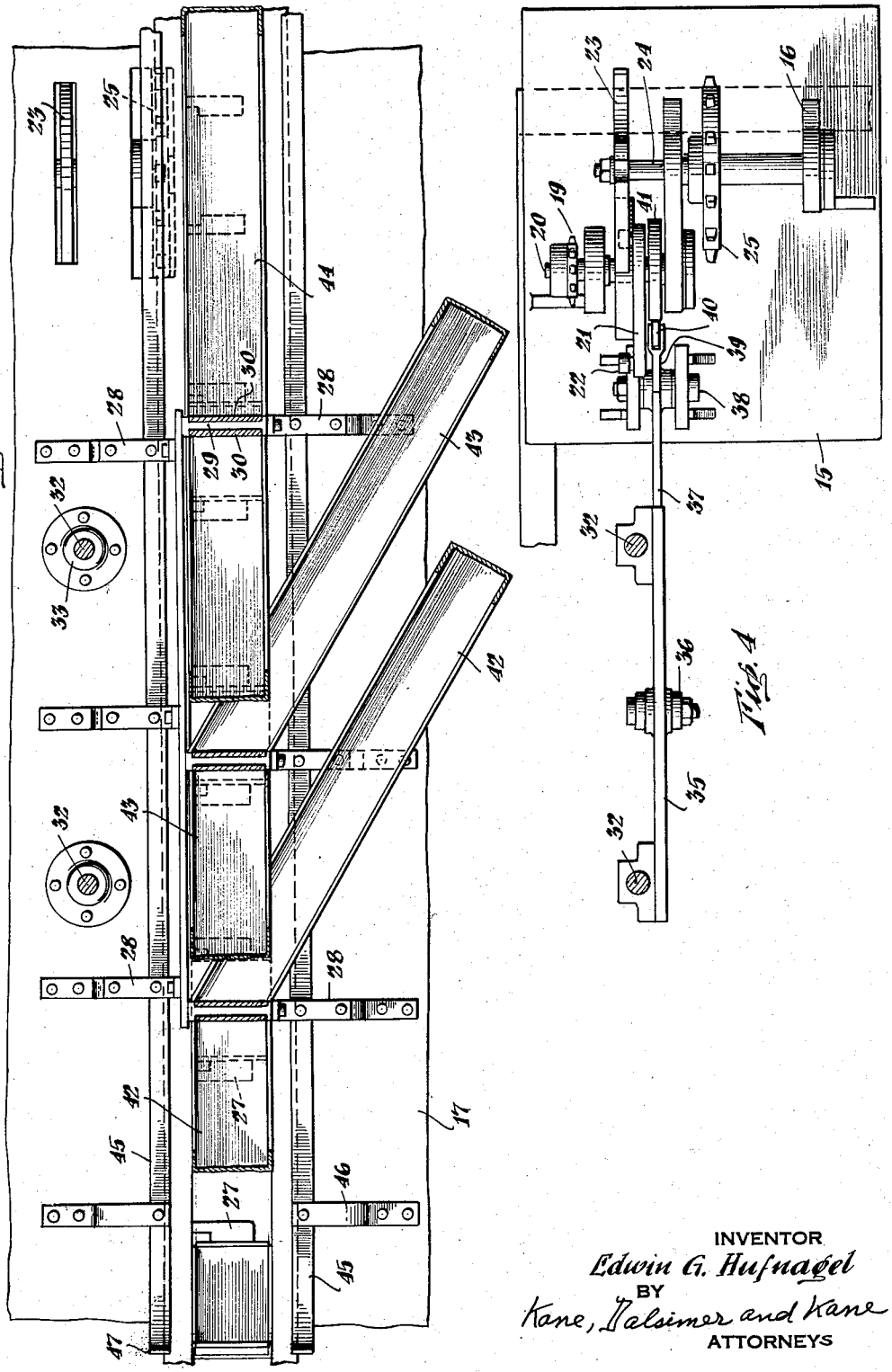

2,880,559
Patented Apr. 7, 1959

2,880,559
MACHINE AND METHOD OF MAKING AN ICE CREAM AND SIMILAR UNIT

Edwin G. Hufnagel, Fanwood, N.J., assignor to Burry Biscuit Corporation, Elizabeth, N.J., a corporation of Delaware Application October 31, 1956, Serial No. 619,420

3 Claims. (Cl. 53—154)

This invention relates to a structurally and functionally improved machine for the manufacture of edible units largely composed of ice cream or similar material and also relates to a novel method of producing those units.

It is an object of the invention to furnish a novel machine by means of which edible units of the ice cream type may be efficiently produced in package form. In its more specific aspects, the final unit will be in the form of a completely packaged "ice cream cake."

A further object is that of teaching an economical method which may be practiced by the employment of the machine and without the necessity of using highly skilled personnel; the following of that method resulting in economically produced and uniform packages, each embracing a desired assembly.

With these and other objects in mind, reference is had to the attached sheets of drawings illustrating one practical embodiment of the invention and in which:

Fig. 1 is a side elevation of the essential parts of the machine and the operating mechanism therefor;

Fig. 2 is a transverse sectional view taken along the line 2—2 in the direction of the arrows as indicated in Fig. 1;

Figs. 3 and 4 are fragmentary sectional plan views taken respectively along the lines 3—3 and 4—4 in the direction of the arrows as also indicated in Fig. 1;

Figs. 5 to 9 inclusive are somewhat diagrammatic sectional side views showing the steps involved in the production of the desired cake or package;

Fig. 10 is a fragmentary plan view in section and in enlarged scale taken along the line 10—10 in the direction of the arrows as indicated in Fig. 1; and Fig. 11 is a perspective view of a grouping of mechanism which may be resorted to in order to achieve the desired end result.

Referring primarily to Figs. 1 and 2, the numeral 15 indicates a base from which a supporting frame 16 may extend upwardly. This frame mounts a deck 17 and also conveniently supports parts of the operating mechanism for the machine. That operating mechanism may involve a drive 18 connected to a sprocket 19 supported by a shaft 20. With a view to imparting to a conveyor forming part of the assembly a desired intermittent movement, a feed of the "Geneve Cross" type may be employed. This will include, for example, a pair of arms 21 affixed to shaft 20 and provided with rollers 22 which sequentially enter the slots of the main member 23. Thus, in well-known manner, this unit will be intermittently moved and in the intervals between movements will be maintained in an immobilized condition by means of the dwell portions in its periphery cooperating with similar portions forming a part of arm 21. A pair of these arms is preferably employed to assure an adequate feed or movement on the part of member 23 without having the assembly involve too great a size.

Member 23 is secured to shaft 24 rotatably supported within part of the frame 16. A sprocket 25 is secured against rotation to shaft 24 and has its upper zone extending through an opening formed in the deck or table 17 so that its teeth engage the links of a chain 26. The latter is preferably positioned to one side of the center axis of the machine and mounts feeding and maintaining elements conveniently in the form of arms terminating in package-engaging portions 27. These preferably are in line with the machine axis.

The foregoing is largely illustrative of a preferred form of feeding and arresting mechanism which is embraced within the machine. It is apparent that other types of conveyors might be employed and that the driving mechanism for the conveyors could be suitably modified to assure the desired movement on the part of the units passing through the machine. Those movements, however, should preferably be of an intermittent nature as will hereinafter become apparent.

Above deck 17, a suitable supporting structure 28 is provided. That structure mounts separating and guiding members 29 which are retained against movement in positions overlying the path of the travel of units which are being operated upon and produced by the machine. Pairs of plates 30 are supported for reciprocating movements, one adjacent each of the side faces of member 29. As shown especially in Fig. 1, three pairs of these assemblies are present and all three pairs of plates 30 preferably have their upper ends connected to a common operating head 31. That head is supported by a pair of posts 32 having their lower ends extending through guides 33 fixed with respect to deck 17. Springs 34 encircle the posts and are interposed between the head 32 and the guides 33 to normally maintain the former in an elevated position.

With a view to reciprocating posts 32, the lower ends of the latter extend below guides 33 and deck 17 and are connected to an actuating member 35. One end of a link 36 is pivotally coupled to that member. The opposite end of the link is similarly connected to one arm 37 of a bell crank lever. That lever is rockingly supported as at 38 by frame 15. Its second arm 39 mounts an antifriction element such as a roller 40. The roller engages the periphery of a cam 41 conveniently secured to shaft 20. It is apparent that springs 34 will exert a force on posts 32 to draw actuating member 35 upwardly and correspondingly shift arm 37 of the bell crank lever. Therefore, one will be assured that the opposite end or arm 39 of that lever will be in operative association with cam 41. Again, it is apparent that any suitable and acceptable form of operating mechanism may be employed to assure a properly timed depressing of head 31 and the pairs of the plates 30 connected therewith.

Associated with each of the partition and guiding members 29 are a pair of delivery chutes. These chutes are preferably arranged in the form of a V with the juncture of the arms being defined by one of the partition members. As shown, three pairs of these chutes at 42, 43 and 44 are provided. The lower ends of the chutes align with the path of travel or axis of the machine as defined by the contact members 27. In order that the chutes do not conflict with the mechanism disposed within the path of travel or with each other, at least the rearwardly extending chutes of pairs 42 and 43 may be angularly offset from the travel path defined by the actuating portions of the conveyor. This has been illustrated in Fig. 3 in which it will be seen that the rearmost chutes of these pairs extend below the foremost chutes of the pairs 43 and 44 so that a non-conflicting disposition of the parts occurs.

Receptacles or boxes which are included as part of the unit to be provided by the machine will ordinarily embrace a rectangular configuration including four side walls and a base portion. Adjacent the upper edges of the side walls, flaps will be provided. These flaps when folded over will, in effect, completely close the upper end of the receptacle. During the filling of the box, the flaps must of course assume positions in which they will not interfere with the necessary operations performed by the machine. To this end, what might be termed the forward and rear flaps of the receptacle will conveniently be retained in contact with the front and rear side walls of the box, by means of the engaging elements 27 associated with the conveyor chain 26. The flaps extending from points adjacent the upper edges of the left and right side walls of the box will be maintained against swinging into positions at which they partially close the upper box face by means of guides. These guides, as shown in Figs. 1 and 2, embrace spaced parallel bars or rails 45 mounted by supports 46 extending upwardly from deck 17. The forward ends of these guides may diverge with respect to each other as at 47 in order to furnish an entrance portion or zone for the side flaps of the box.

Guides 45 may be continued to the rear of the structure shown in Fig. 1 in the form of corresponding rails 48 and 49. Rail 48 may be twisted as at 50 to provide a camming or guide portion causing a flap cooperating therewith to be folded over as that flap is moved longitudinally of guides 48 and 49. The latter may be formed with a similar portion 51 so that the second flap of the box may be folded upon the body of the latter to overlie that flap which has been swung by the guiding portion 50 of rail 48.

It is in this same view that the box, in its preferred form, is shown to best advantage. Thus, the numeral 52 indicates the side walls of the receptacle which are connected together adjacent their lower ends by a conventional base portion. Extending from the upper edges of the front and rearmost side walls are flaps 53. Extending from the same edges of the left and right side walls 52 are flaps 54. While the depth of these flaps may be varied, it is definitely preferred that they embrace dimensions such that when folded to extend parallel to the base portion of the box, they overlap each other so that an effective and complete closure is furnished, especially when flaps 54 have once been folded upon flaps 53.

Preferably, the same conveyor 26, which has moved the boxes successively along the path illustrated in Fig. 1, may move them through the stations defined by guiding and camming portions 50 and 51 in Fig. 11. A second and similar conveyor receives them thereafter and may move them in a path at right angles to the one defined by conveyor 26. This second conveyor has not been shown in Fig. 11. However, it will be understood that this further conveyor will not have contacting parts such as 27 engaging flaps 53 and which latter flaps have been held in position throughout the entire course of travel as depicted in Fig. 1 and the lower portion of Fig. 11. Of course, if desired, some form of contact device assuring against relative movements of the boxes with respect to the second conveyor might be associated with the latter.

As the receptacles are moved, by the second conveyor, those flaps 53 which have heretofore defined the forward and rear faces of the box become side flaps with the change in direction of travel. Guiding portions 55 are furnished in the forward end of rails or bars 57 disposed adjacent the path of travel of the second conveyor. These guiding portions will ride into the spaces existing between the side walls 52 of the box and the flaps 53 and incident to camming portions 56 embodied in those rails and will cause these flaps to extend outwardly. As the box moves with respect to the conveyor, an angularly extending part 58 of one rail 57 will cam one of the outstanding flaps 53, to force it to occupy a position overlying the pair of inwardly folded flaps 54. Thereafter, a similar guiding portion 59 in the second rail or guiding strap 57 will achieve the same result with the second flap 53. In this manner, all four flaps of the box will be folded inwardly upon themselves to furnish an upper closure.

It is desired that adjacent the rear end of the second conveyor, a mechanism be furnished to press the flap assembly downwardly so that all parts of the same extend in planes substantially parallel to the base of the box. To this end and as shown in Fig. 11 a presser plate 60 is conveniently employed and overlies the path of travel of the receptacle. In order to shift plate 60, any suitable mechanism may be employed. Conveniently, and as shown, it may be connected to the spring-pressed armature 61 of an electro-magnet 62. That magnet may be controlled through a suitable relay mechanism (not shown) by a photo-electric cell 63 disposed adjacent the path of travel of the closed boxes. The cell is energized by, for example, a light source 64.

In operation, it will be understood that conveyor 26 may extend forwardly of the mechanism as shown in Fig. 1. A box erecting apparatus may be disposed at that forward point. Otherwise, the boxes may, for example, manually have their parts manipulated so as to furnish side walls providing an enclosure and a base portion from which those side walls extend upwardly with the flaps projecting outwardly from the side walls adjacent their upper edges.

At that moment they may be supported upon the deck 17 or associated with a conveyor preceding conveyor 26. In any event, as they are moved, they shift past a nozzle through which, for example, ice cream in a plastic form is discharged into their interiors. This discharge occurs to a depth as shown in Fig. 5 where, for example, two-thirds or three-quarters of the receptacle interior is filled with a mass 66 of this substance. The pairs of chutes 42, 43 and 44 receive layers of cake material in the form of, for example, cookies 65. These are disposed in vertical positions within the chutes and due to the inclination of the latter feed downwardly to discharge stations as defined by the guiding and partition members 29 which segregate the two different rows of edible material within the two different chutes. The cookies are, for example, manually disposed within the chutes. As head 31 is elevated to correspondingly move plates 30 upwardly over the forward and rear faces of a member 29, two cookies in different branches of a chute-pair move into contact with those faces. As plates 30 move downwardly, this pair of cookies is forced into the interior of the box and towards the base of the same as shown in Fig. 6.

As will be appreciated, referring especially to Fig. 1, the conveyor 26 will—under operation of drive 18—move the cartons so that three of them successively underlie the partition members 29. Side flaps 54 will be maintained in a position where they do not obstruct the open upper face of the carton. Either manually or by suitable mechanism, the front and rear flaps 53 will have theretofore been associated with contact members 27, between a pair of which a box is disposed so that flaps 53 will also be maintained in proper positions.

According to the present exemplification, six layers are disposed within each carton or box. These layers are substantially evenly spaced and when totally immersed serve to displace mass 66 to a point where its upper zone or face is substantially in line with the upper edges of the wafers 65, while the lower edges of the latter engage with the upper face of the box base. The initial pair of chutes 42 serve to centrally deposit a pair of wafers 65 as in Fig. 6. When underlying the point of juncture of the chutes 43, a second pair of wafers are disposed within the rear of the carton spaced from the first-deposited central pair. As the box reaches the point of juncture defined by the chute pair 44, a third pair of cookies is disposed in advance of the initially deposited pair. Due to the displacement effected, the level of mass 66 will gradually rise.

It is desired that none of the ice cream or other material come in contact with plates 30. Therefore, the latter will not press the cookies or layers into contact with the upper face of the base. Rather, as in Figs. 6, 7 and 8, those plates will serve to project the layers to a point where their lower edges are spaced from the base. In this manner, the upper face of the material mass 66 will be well below the lower edges of the plates.

However, as the flaps are folded inwardly upon the receptacle as in Fig. 11, they may lightly press against the upper edges of the cookies to further immerse them. In any event, as they reach a position adjacent pressure plate 60, the flaps will be pressed downwardly as in Fig. 9. With this movement, the cookies will be fully immersed with their lower edges immediately adjacent the base. The parts should be proportioned so that their upper edges will, under these circumstances, be substantially in the same plane as the upper level of the mass 66.

As previously brought out, the boxes are erected either by a suitable mechanism or manually and placed upon a conveyor preceding the chain 26 or its equivalent or else are directly associated with the latter. The latter conveyor may continue through to the pressing mechanism as defined by plate 60 if it is not desired to employ a final conveyor extending at right angles to the axis of chain 26. In any event, after the package has been completed, it will be passed through to a refrigerating room and maintained at a low temperature for any desired storage period.

When it is desired to dispense the cake, this may be accomplished by simply lifting the upper flaps of the box, folding them outwardly and by, for example, slitting the corners defined by the side walls, also folding them outwardly. Under these circumstances, the cake unit would rest upon the base. Now by using a suitable cutting implement and slicing the confection along lines parallel to the base, it is apparent that each slice would embrace adjacent layers of ice cream or other material with layers of cake or cookies interposed between the zones of ice cream. In this manner, an extremely tasty confection which is pleasing in appearance is provided.

Thus among others, the several objects of the invention as specifically aforenoted are achieved. It is obvious that changes in construction of the machine mechanism may be resorted and that the steps of the method may be varied without departing from the spirit of the invention as defined by the claims.

I claim:

1. A machine for making an edible unit, including in combination a conveyor for moving receptacles each having a capacity such that it may receive a mass of plastic material and at least a layer of cake-like substance, said receptacle being partially filled with a plastic mass of material, means for supporting layers of cake-like substance, means functioning to deliver pairs of layers sequentially into a receptacle, means whereby the delivery of an initial layer pair into the receptacle occurs to each side of the central zone of the latter and subsequent deliveries of layer pairs occur one to each side of the points of delivery of the initial pair, means for projecting said layers into said material mass thereby to displace the latter to fill the receptacle to a greater depth and means for assuring the immersion of the layers within said mass to a point such as to cause the upper surface of the latter to occupy a plane substantially identical with the upper edge of the layers.

2. In a machine as defined in claim 1, said receptacles being boxes each comprising a base, side walls extending upwardly therefrom and flaps hingedly attached to the upper edges of said side walls and means for maintaining said flaps in a position in which they do not obstruct access into the interior of the receptacle during the shifting of said layers.

3. In a machine as defined in claim 2, and means for manipulating said flaps to cause the latter to overlie the receptacle interior and press against the upper edges of said layers whereby to tend to shift the latter toward the box base and insure substantially the complete immersion of the layers within the box.

References Cited in the file of this patent

UNITED STATES PATENTS

| | | |
|---|---|---|
| 1,596,514 | Anderson | Aug. 17, 1926 |
| 1,975,936 | Goodwin | Oct. 9, 1934 |
| 2,517,756 | Zabrickie et al. | Aug. 8, 1950 |
| 2,521,403 | Overland | Sept. 5, 1950 |
| 2,639,677 | Anderson | May 26, 1953 |